US012586770B2

(12) United States Patent
Ueno

(10) Patent No.: US 12,586,770 B2
(45) Date of Patent: Mar. 24, 2026

(54) MASS SPECTROMETER

(71) Applicant: Shimadzu Corporation, Kyoto (JP)

(72) Inventor: Yoshihiro Ueno, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 334 days.

(21) Appl. No.: 18/285,119

(22) PCT Filed: May 14, 2021

(86) PCT No.: PCT/JP2021/018471
§ 371 (c)(1),
(2) Date: Sep. 29, 2023

(87) PCT Pub. No.: WO2022/239243
PCT Pub. Date: Nov. 17, 2022

(65) Prior Publication Data
US 2024/0186134 A1 Jun. 6, 2024

(51) Int. Cl.
*H01J 49/14* (2006.01)
*H01J 27/20* (2006.01)
*H01J 49/06* (2006.01)
*H01J 49/42* (2006.01)

(52) U.S. Cl.
CPC .......... *H01J 49/147* (2013.01); *H01J 27/205* (2013.01); *H01J 49/061* (2013.01); *H01J 49/4215* (2013.01)

(58) Field of Classification Search
CPC ........ H01J 27/205; H01J 49/061; H01J 49/14; H01J 49/147; H01J 49/4215
See application file for complete search history.

(56) References Cited

U.S. PATENT DOCUMENTS

2016/0247669 A1* 8/2016 Tateishi ................ H01J 49/067
2020/0020502 A1* 1/2020 Welkie .................... H01J 37/08

FOREIGN PATENT DOCUMENTS

JP 2016-157523 A 9/2016

OTHER PUBLICATIONS

First Office Action dated Feb. 13, 2024 issued for the corresponding Japanese Patent Application No. 2023-520729.
Written Opinion of the International Searching Authority (ISA237) for PCT application No. PCT/JP2021/018471 dated Jul. 6, 2021.

* cited by examiner

*Primary Examiner* — David E Smith
(74) *Attorney, Agent, or Firm* — Muir Patent Law, PLLC

(57) ABSTRACT

One mode of the mass spectrometer according to the present invention is a mass spectrometer including an ion source configured to ionize a component contained in a sample gas, the ion source including: an ionization chamber having an ion ejection opening and forming a space substantially partitioned from an outside inside the ionization chamber; a thermal electron supply unit configured to supply thermal electrons to an inside of the ionization chamber; a magnetic field forming unit configured to form a magnetic field inside the ionization chamber such that the thermal electrons move helically; and a deflection electric field forming unit configured to form a deflection electric field deflecting ions derived from the component generated in the ionization chamber by a direct or indirect action of the thermal electrons in a direction against a force received from the magnetic field when the ions are moving toward the ion ejection opening.

2 Claims, 18 Drawing Sheets

MASS SPECTROMETER

TECHNICAL FIELD

The present invention relates to a mass spectrometer, and more specifically, relates to a mass spectrometer including an ion source by an ionization method such as an electron ionization (EI) method, a chemical ionization (CI) method, or a negative chemical ionization (NCI) method.

BACKGROUND ART

In mass spectrometry of a gaseous sample molecule, there is used a mass spectrometer equipped with an ion source by an ionization method such as the EI method, the CI method, or the NCI method. The mass spectrometer described in Patent Literature 1 is a mass spectrometer equipped with an EI ion source.

As described in Patent Literature 1, the EI ion source includes an ionization chamber of a box-shape. An electron introduction opening is formed on one of opposing walls of the ionization chamber, and an electron discharge opening is formed on the other. When an electric current is supplied to the filament disposed outside the electron introduction opening, the filament generates heat to generate thermal electrons. The thermal electrons are accelerated by the electric field, enter the ionization chamber through the electron introduction opening, and travel toward the trap electrode disposed outside the electron discharge opening. Thus, a thermal electron flow passing through the ionization chamber is formed. The gaseous sample molecules supplied into the ionization chamber come into contact with the thermal electrons and are ionized by interaction with the thermal electrons.

A pair of magnets is disposed outside the filament and the trap electrode so as to sandwich the filament and the trap electrode, and the pair of magnets form a magnetic field having magnetic field lines in a direction parallel to the thermal electron flow in the ionization chamber. The thermal electrons receive a Lorentz force due to the magnetic field and travel while helically swirling around the magnetic field lines. Thus, a spread of the thermal electron flow is suppressed, the probability of contact between the thermal electrons and the sample molecules increases, and the ionization efficiency is enhanced.

The sample molecular ions generated in the ionization chamber as described above are extracted from the inside of the ionization chamber to the outside through an ion ejection opening by an electric field formed by one or both of an extraction electrode disposed outside the ionization chamber and a repeller electrode disposed inside the ionization chamber. The extracted ions are introduced into a mass separator such as a quadrupole mass filter through an ion transport optical system, separated according to a mass-to-charge ratio (strictly speaking, it is represented by “m z” in italics, but in the present specification, it is described as “mass-to-charge ratio” or “m/z”), and detected.

CITATION LIST

Patent Literature

Patent Literature 1: JP 2016-157523 A

SUMMARY OF INVENTION

Technical Problem

The above mass spectrometer is often used as a gas chromatograph mass spectrometer (GC-MS) in combination with a gas chromatograph. In this case, helium is often used as the carrier gas of the gas chromatograph, and the lower limit of the measurement range of the mass-to-charge ratio is higher than the mass-to-charge ratio of helium ions so that a large amount of helium ions generated by the ion source does not enter the ion detector. Whereas, there is a demand from users that a sample is directly introduced into a mass spectrometer without using a gas chromatograph, and ions having a low mass-to-charge ratio, such as ions derived from sample molecules such as hydrogen and helium contained in the sample or hydrogen ions generated by fragmentation, are quantified with high sensitivity.

However, as described above, this type of mass spectrometer is generally used as GC-MS, and in that case, ions having a very low mass-to-charge ratio are unable to be observed. That is, analysis of such low mass-to-charge ratio ions with high sensitivity has not been fully considered.

The present invention has been made to solve such problems, and an object thereof is to achieve high analysis sensitivity particularly for ions having a low mass-to-charge ratio in a mass spectrometer equipped with an ion source that uses thermal electrons for ionization, such as an EI ion source.

Solution to Problem

One mode of the mass spectrometer according to the present invention made to solve the above problems is a mass spectrometer including an ion source configured to ionize a component contained in a sample gas, the ion source including:

- an ionization chamber having an ion ejection opening and forming a space substantially partitioned from an outside inside the ionization chamber;
- a thermal electron supply unit configured to supply thermal electrons to the inside of the ionization chamber;
- a magnetic field forming unit configured to form a magnetic field inside the ionization chamber such that the thermal electrons move helically: and
- a deflection electric field forming unit configured to form a deflection electric field deflecting ions derived from the component generated in the ionization chamber by a direct or indirect action of the thermal electrons in a direction against a force received from the magnetic field when the ions are moving toward the ion ejection opening.

Advantageous Effects of Invention

In a general mass spectrometer, a magnetic field formed in an ionization chamber has a function of suppressing spread of the thermal electron flow, but ions having a low mass-to-charge ratio are also affected by the magnetic field, and the ion trajectory is bent when the ions travel toward an ion ejection opening. In the case of observing ions with a low mass-to-charge ratio, bending of the trajectories of the ions due to the influence of such a magnetic field can become one of the major factors of ion loss.

In contrast, in the mass spectrometer of the above mode according to the present invention, it is possible to correct the bending of the trajectory generated when the ions generated in the ionization chamber receive the force from the magnetic field by the action of the electric field formed by the deflection electric field forming unit. With this configuration, it is possible to suppress loss when ions generated in the ionization chamber are extracted from the ionization chamber to the outside, and to improve ion extraction efficiency. As a result, a larger amount of ions can be subjected to mass spectrometry, and high analysis sensitivity can be achieved.

DESCRIPTION OF EMBODIMENTS

In the mass spectrometer according to the present invention, the ion source performs ionization using thermal electrons, and is specifically, for example, an ion source by the EI method, the CI method, or the NCI method. In addition, a method and a mode of mass separation are not limited to a specific method and mode. In addition, the mass spectrometer may be a mass spectrometer having a region for dissociating ions, such as a collision cell or an ion trap, and capable of performing MS/MS analysis or $MS^n$ analysis (n is an integer of 3 or more).

Hereinafter, an embodiment of a mass spectrometer according to the present invention will be described with reference to the accompanying drawings.

Figure 1:
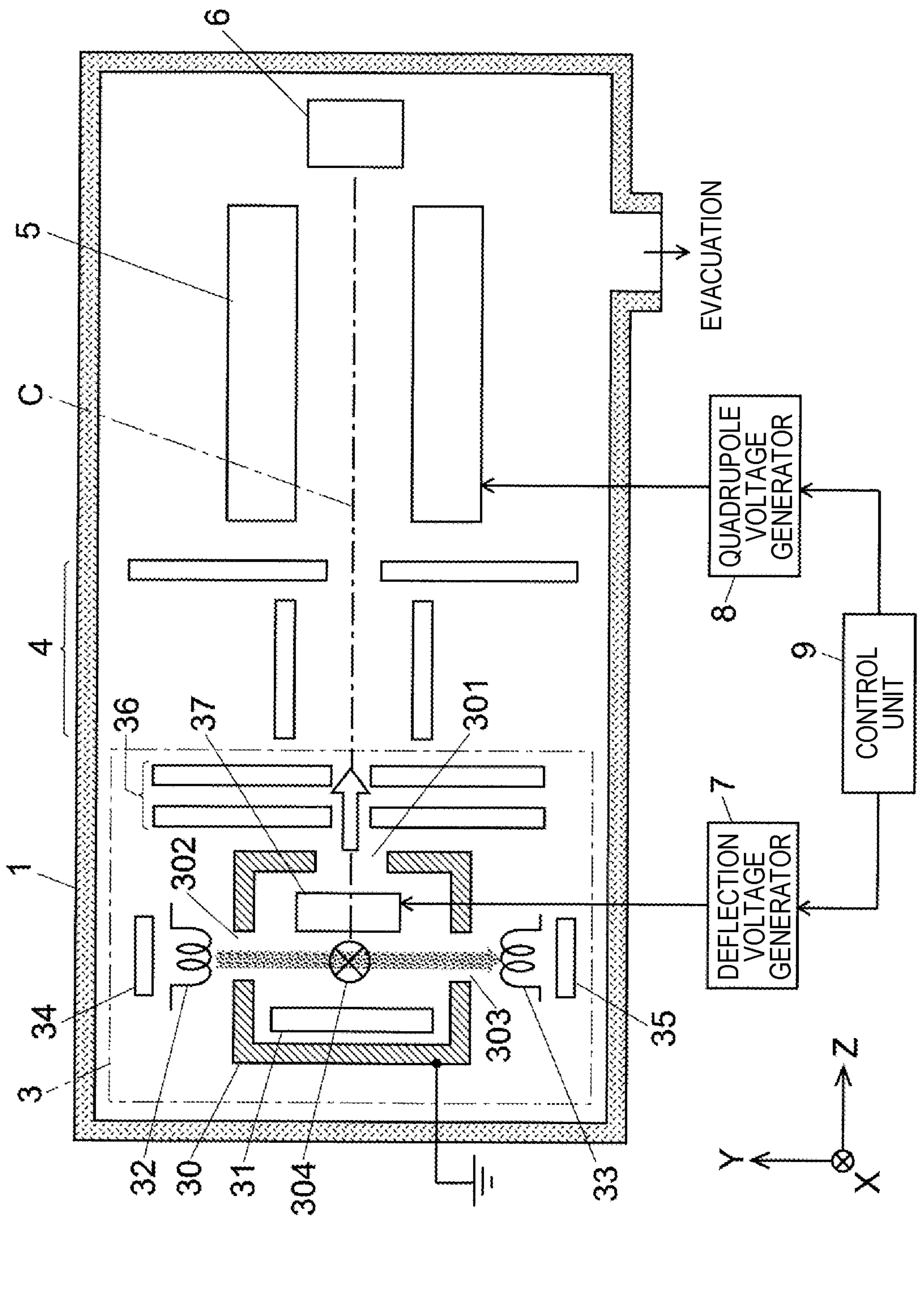
FIG. 1 is an overall configuration view of a mass spectrometer according to an embodiment of the present invention.
Figure 2A:
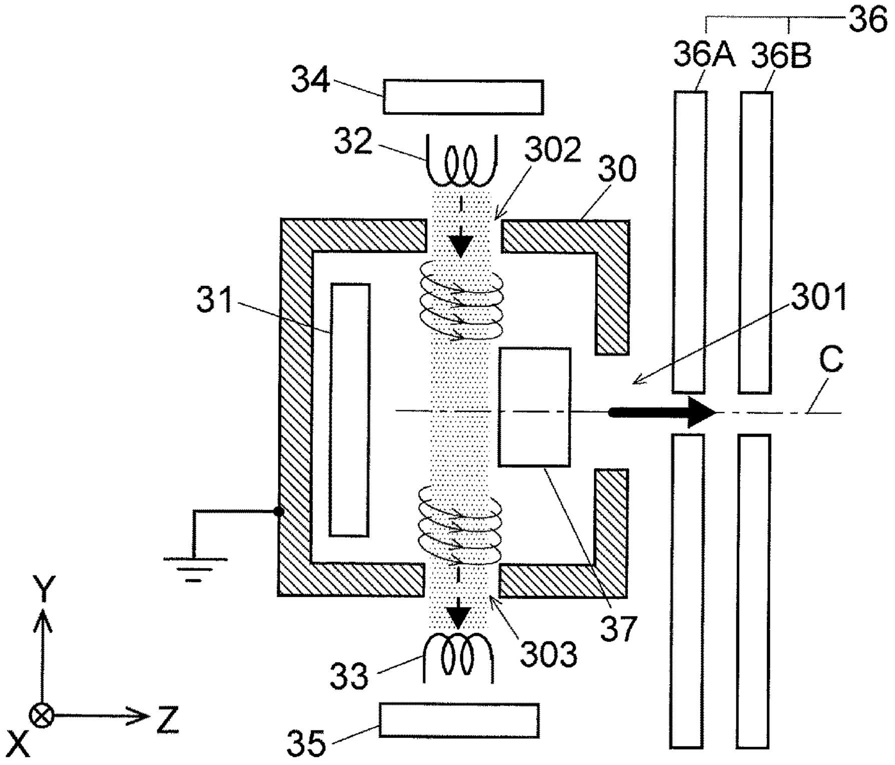
FIG. 2A is a schematic longitudinal end view and FIG. 2B is a schematic lateral end view of an ion source in the mass spectrometer of the present embodiment.
Figure 2B:
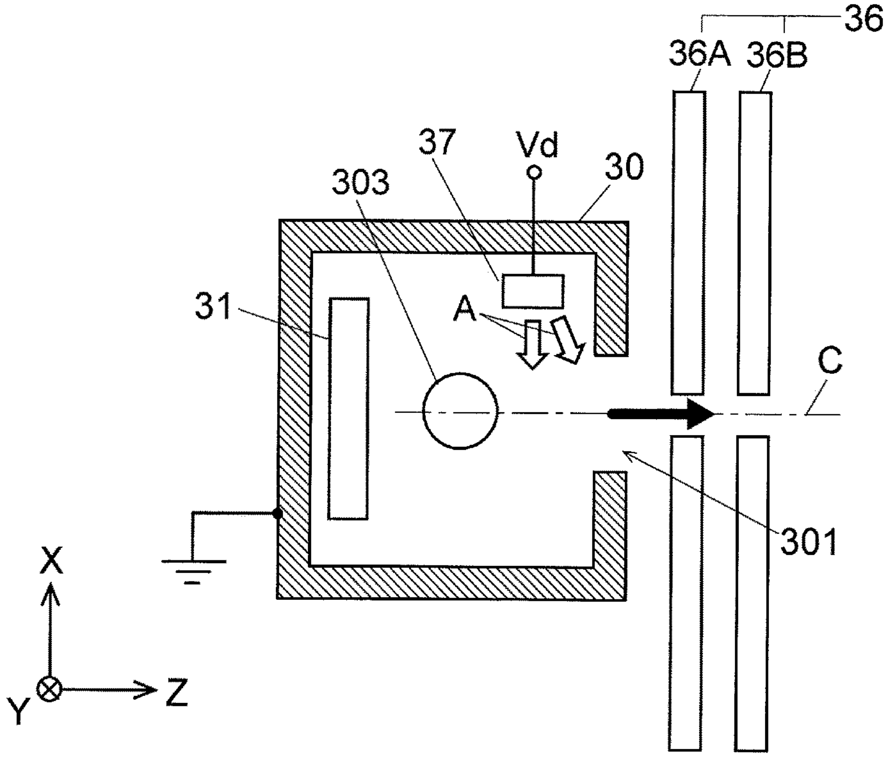

FIG. 1 is an overall configuration view of a mass spectrometer of the present embodiment. FIG. 2A is a schematic longitudinal end view and FIG. 2B is a schematic lateral end view of the ion source in the mass spectrometer of the present embodiment. This mass spectrometer is a single quadrupole mass spectrometer. Note that for convenience of description, three axes of X, Y, and Z, which are orthogonal to each other, are defined as illustrated in FIG. 1 and FIGS. 2A and 2B.

As illustrated in FIG. 1, the mass spectrometer according to the present embodiment has a chamber 1 evacuated by a vacuum pump (not illustrated), within which an EI ion source 3, ion transport optical system 4, quadrupole mass filter 5, and ion detector 6 are arranged along an ion optical axis C. In the present example, the ion optical axis C is parallel to the Z-axis direction.

The EI ion source 3 has a substantially rectangular parallelepiped outer shape and includes an ionization chamber 30 made of a conductive material such as metal. An ion ejection opening 301, an electron introduction opening 302, and an electron discharge opening 303 are formed in the side wall, the upper wall, and the lower wall of the ionization chamber 30, respectively. A repeller electrode 31 is disposed inside the ionization chamber 30, a filament 32 outside the electron introduction opening 302, and a trap electrode 33 outside the electron discharge opening 303. In addition, a pair of magnets 34 and 35 is disposed above and below the filament 32 and the trap electrode 33 so as to sandwich the filament and the trap electrode, and two pieces of extraction electrodes 36A and 36B (collectively referred to as reference numeral 36) in which an ion passing opening is formed are disposed outside the ion ejection opening 301. Furthermore, a deflection electrode 37 is disposed inside the ionization chamber 30, and a sample gas introduction tube 304 is connected to a side wall of the ionization chamber 30.

The ionization chamber 30 is grounded and has a potential of 0 V. A predetermined DC voltage Vd is applied from the deflection voltage generator 7 to the deflection electrode 37. The deflection voltage generator 7 is controlled by a control unit 9 together with the quadrupole voltage generator 8 that applies a voltage to each electrode of the quadrupole mass filter 5. Although not illustrated in FIG. 1, the mass spectrometer also includes a voltage generator that applies predetermined voltages to the filament 32, the trap electrode 33, the extraction electrode 36, the ion transport optical system 4, and the like.

Next, an operation for a mass spectrometric analysis performed in the mass spectrometer according to the present embodiment is described with reference to FIG. 1 and FIGS. 2A and 2B.

The sample gas is introduced into the ionization chamber 30 from, for example, a direct sample introduction device through the sample gas introduction tube 304. An electric current is supplied to the filament 32. The filament 32 is thereby heated and generates thermal electrons. A predetermined potential difference is formed between the filament 32 and the trap electrode 33 by voltages respectively applied to the filament and the trap electrode, and thermal electrons are accelerated by the potential difference and travel toward the trap electrode 33. That is, as illustrated in FIG. 2A, there is formed a thermal electron flow that passes through the ionization chamber 30 from the filament 32 toward the trap electrode 33, that is, travels in the negative direction of the Y-axis. A pair of the magnets 34 and 35 form a magnetic field that draws a magnetic flux line parallel to the thermal electron flow, in the ionization chamber 30. Each thermal electron flies so as to move helically around the magnetic flux line. With this configuration, the thermal electron flow is prevented from spreading in the X-axis direction as well as in the Z-axis direction.

Sample molecules contained in the sample gas are ionized by being brought into contact with thermal electrons. The extrusion electric field formed in the ionization chamber 30 by the potential difference between the repeller electrode 31 and the inner wall of the ionization chamber 30 has an action of pushing the ions generated as described above substantially in the Z-axis direction, that is, in the direction toward the ion ejection opening 301. Whereas, the extraction electrode 36 is supplied with a direct voltage having an opposite polarity to the ions. The extracting electric field created by this voltage penetrates into the ionization chamber 30 through the ion ejection opening 301. This extracting electric field has the effect of forcing the ions to move toward the ion ejection opening 301. The ions generated in the ionization chamber 30 are extracted to the outside through the ion ejection opening 301 by the action of both the extrusion electric field and the extraction electric field, and are introduced into the ion transport optical system 4.

Within the ion transport optical system 4, the ions are temporarily converged into an area near the ion optical axis C and sent to the quadrupole mass filter 5. A predetermined voltage obtained by superimposing a radio-frequency voltage (RF voltage) on a DC voltage is applied from the quadrupole voltage generator 8 to four pieces of the rod electrodes constituting the quadrupole mass filter 5, and only ions having a specific mass-to-charge ratio corresponding to the voltage selectively pass through the quadrupole mass filter 5. The ion detector 6 produces a detection signal corresponding to the amount of ions which have reached the same detector. Accordingly, for example, by controlling the applied voltage so that the mass-to-charge ratio of the ion which is allowed to pass through the quadrupole mass filter 5 continuously varies within a predetermined range, a set of mass spectrum data which show the ionic intensity over the predetermined range of mass-to-charge ratios can be acquired.

Next, a characteristic configuration and operation of the EI ion source 3 will be described with reference to FIGS. 3 to 16. These views are all simulation results, and FIGS. 3 to 12 are plan views illustrating simulation results of ion trajectories in the ionization chamber 30. FIGS. 13 to 16 are views illustrating simulation results of temporal changes in the position of ions in the Z-axis direction inside the ionization chamber 30.

As described above, a magnetic field is formed inside the ionization chamber 30. The magnetic flux lines in the magnetic field are oriented in a direction orthogonal to the paper surface of FIGS. 3 to 12 (a direction approaching the paper surface from the upper side of the paper surface). The Lorentz force due to the magnetic field acts not only on thermal electrons but also on various ions generated inside the ionization chamber 30.

Figure 3:
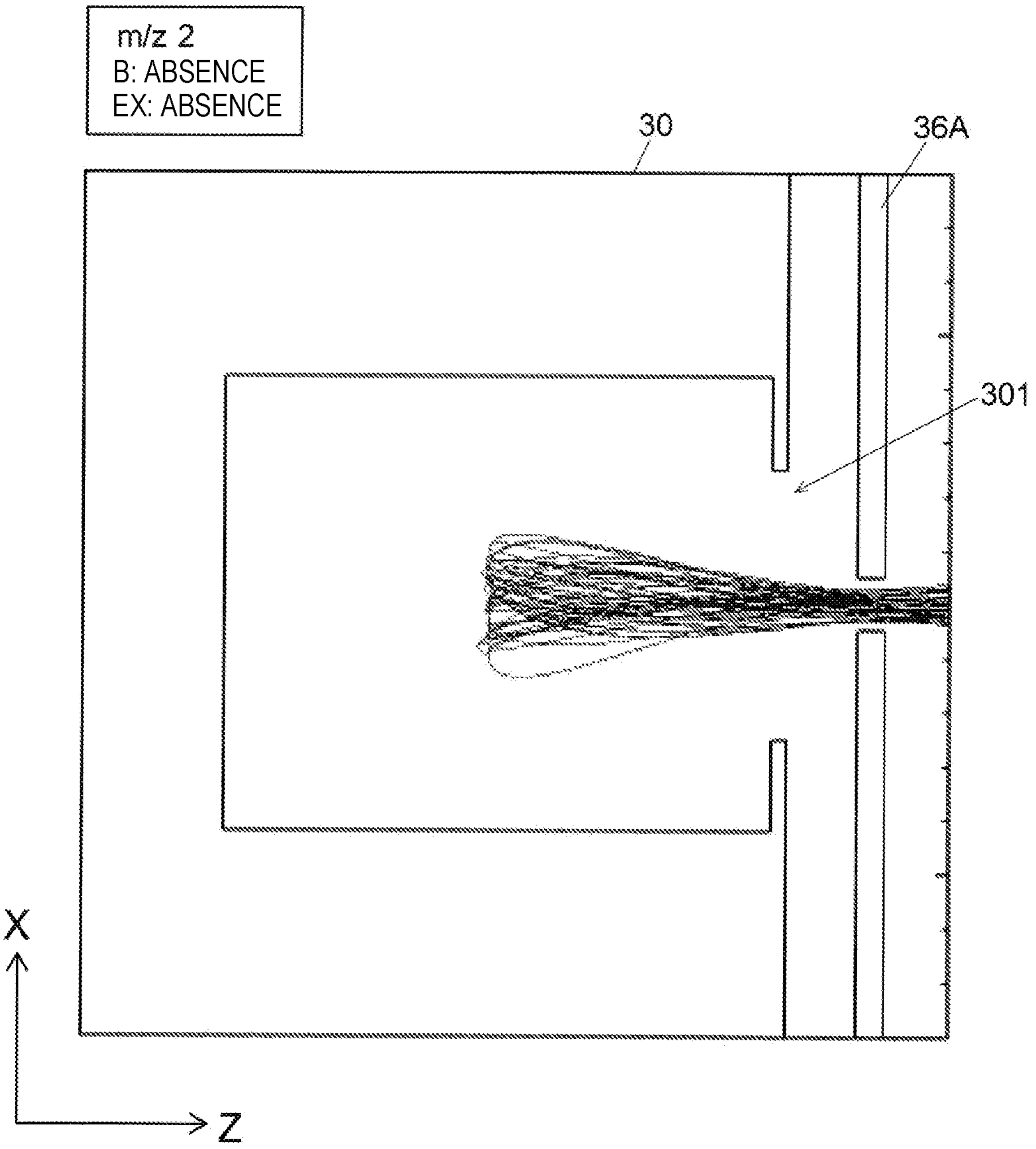
FIG. 3 is a view illustrating a simulation result of an ion trajectory inside an ionization chamber (m/z 2, without both the magnetic field for convergence of thermal electrons and the deflection electric field).
Figure 4:
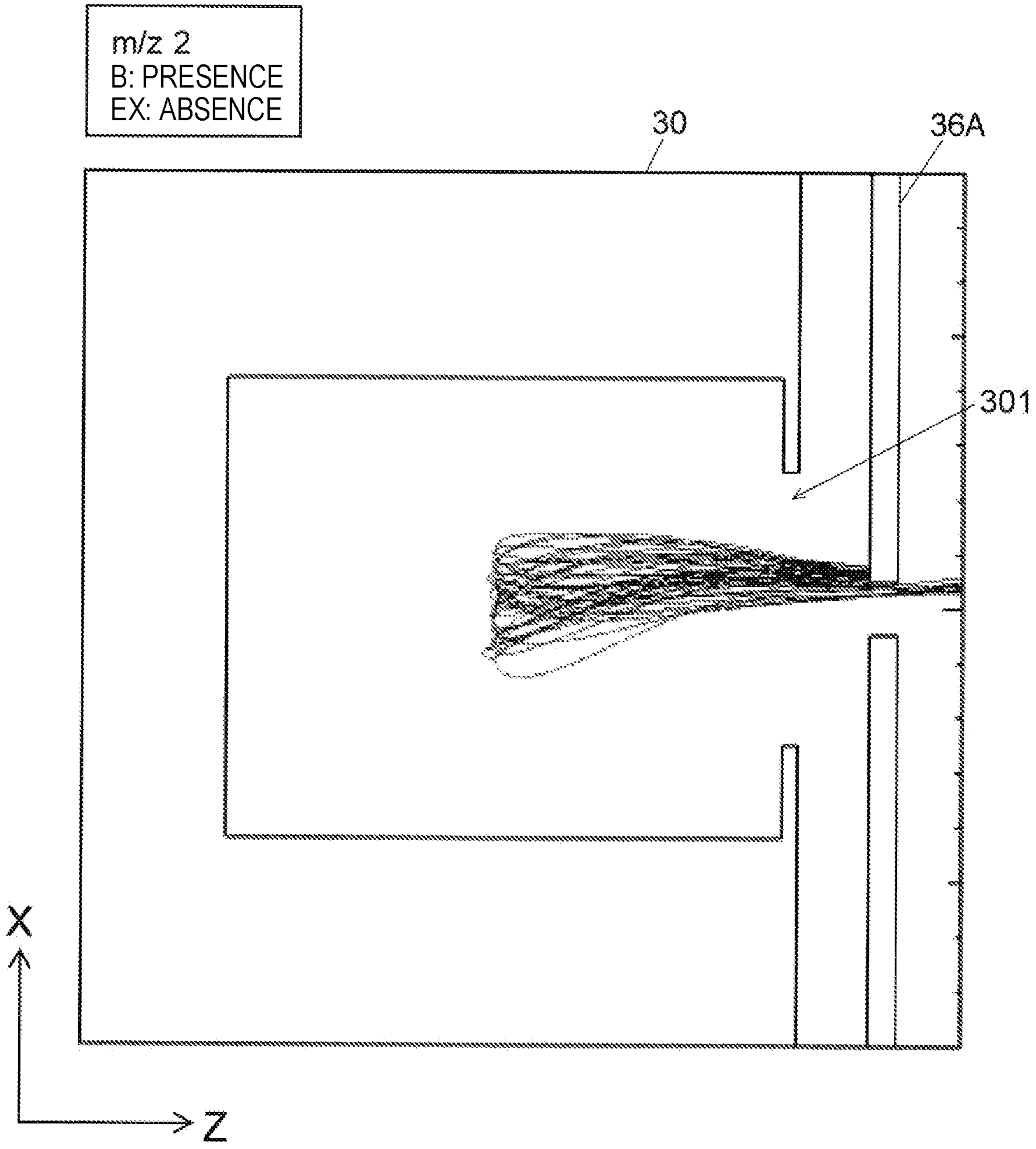
FIG. 4 is a view illustrating a simulation result of an ion trajectory inside an ionization chamber (m/z 2, with the magnetic field for convergence of thermal electrons and without the ion deflection electric field).
Figure 5:
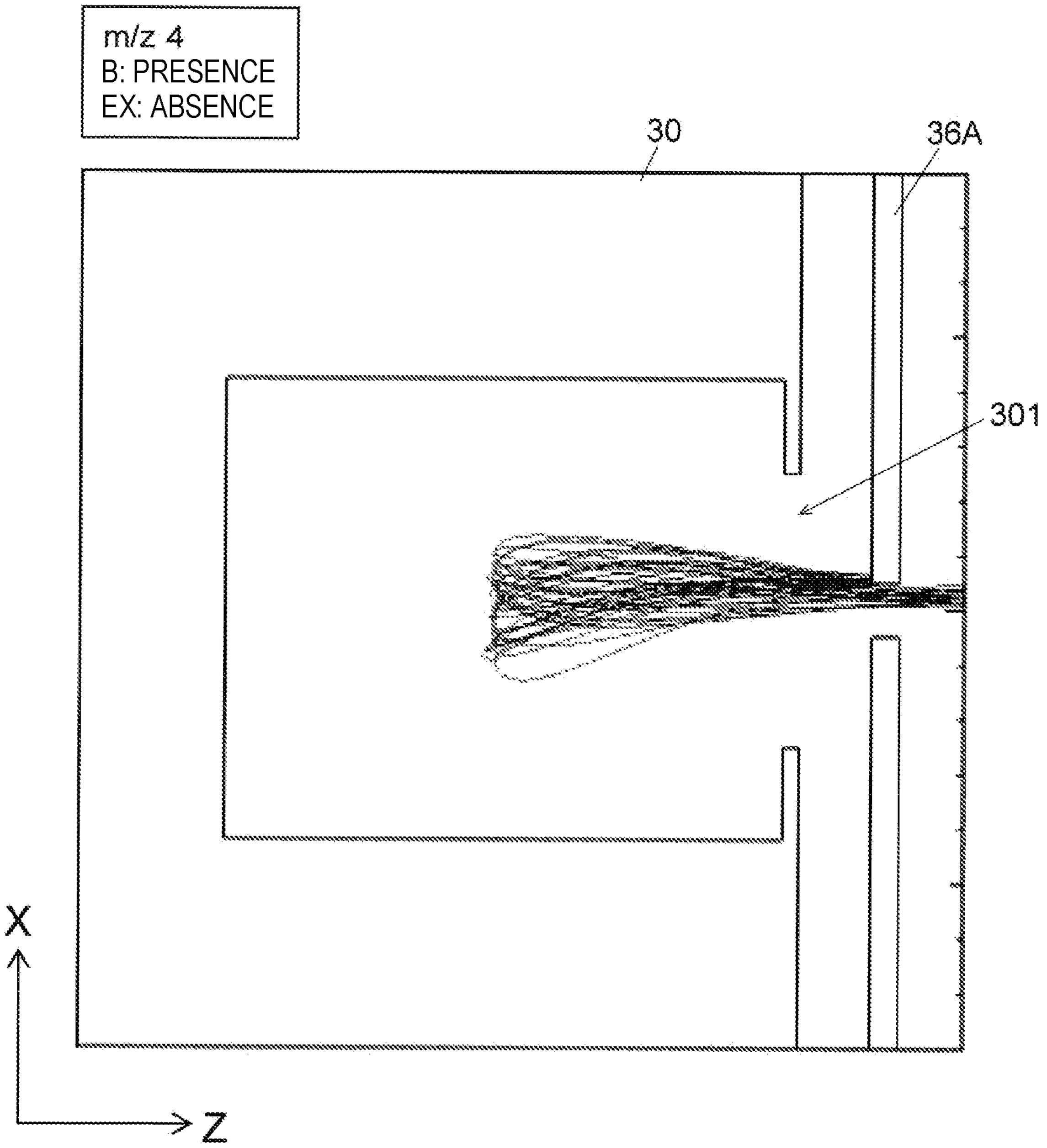
FIG. 5 is a view illustrating a simulation result of an ion trajectory inside an ionization chamber (m/z 4, with the magnetic field for convergence of thermal electrons and without the ion deflection electric field).
Figure 6:
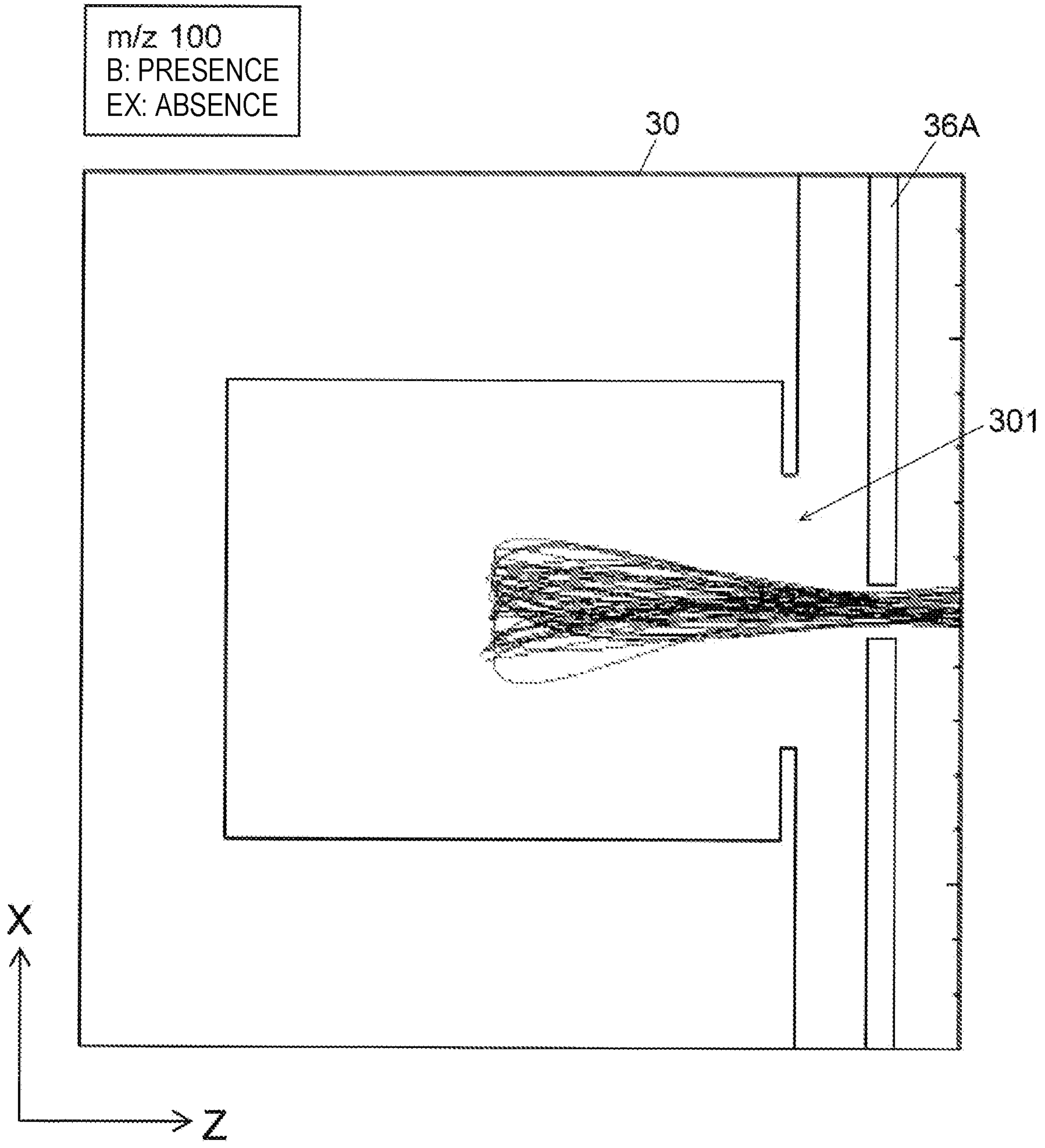
FIG. 6 is a view illustrating a simulation result of an ion trajectory inside an ionization chamber (m/z 100, with the magnetic field for convergence of thermal electrons and without the ion deflection electric field).

FIG. 3 is a simulation result of the trajectory of the ion of m/z 2 when neither the magnetic field (described as "B" in FIGS. 3 to 16) nor the deflection electric field (described as "EX" in FIGS. 3 to 16) described later is present. FIGS. 4 to 6 are simulation results of trajectories of ions respectively at m/z 2, m/z 4, and m/z 100 where a deflection electric field does not exist while a magnetic field exists. FIGS. 4 to 6 can be said to be ion trajectories in a general EI ion source.

As illustrated in FIG. 3, the ions generated in the central portion in the ionization chamber 30 travel toward the ion ejection opening 301 as a whole. Then, due to the action of a converging electric field formed in the vicinity of the ion passing opening of the extraction electrode 36A by the second stage extraction electrode 36B (not illustrated) located on the further right side of the extraction electrode 36A seen in the view, ions are converged and can pass through the ion passing opening. This is the normal and nearly ideal behavior of ions.

As is clear from comparison between FIGS. 3 and 4, when a magnetic field for convergence of thermal electrons, ions (hydrogen ions) of m/z 2 are turned in the positive direction of the X-axis by the Lorentz force, and some of the ions cannot pass through the ion passing opening and collide with the extraction electrode 36A. That is, ion loss occurs. As illustrated in FIG. 5, even in the case of ions (helium ions) of m/z 4, the degree of bending of the trajectory is smaller than that of the hydrogen ions, but some of the ions collide with the extraction electrode 36A. Whereas, as illustrated in FIG. 6, for ions having a larger mass-to-charge ratio, specifically ions of m/z 100, the influence of the Lorentz force is hardly observed. From this, it can be found that the Lorentz force received from the magnetic field is a factor of ion loss only for ions that is light (m/z value is small).

In the mass spectrometer of the present embodiment, as illustrated in FIG. 2B, a predetermined voltage Vd having the same polarity as the polarity of the ions is applied to the deflection electrode 37 disposed in the ionization chamber 30 in order to correct the bending of the trajectory of the ions due to the influence of the magnetic field as described above. In a case where the ion to be measured is a positive ion, applying a positive DC voltage to the deflection electrode 37 forms a deflection electric field that pushes the ion in the negative direction of the X-axis as indicated by an arrow A in FIG. 2B in a part of the ionization chamber 30. As a result, bending of the trajectory of the ion due to the magnetic field can be corrected. Of course, it is also possible to correct the bending of the ion trajectory by forming an electric field that attracts ions instead of an electric field that pushes ions.

Figure 7:
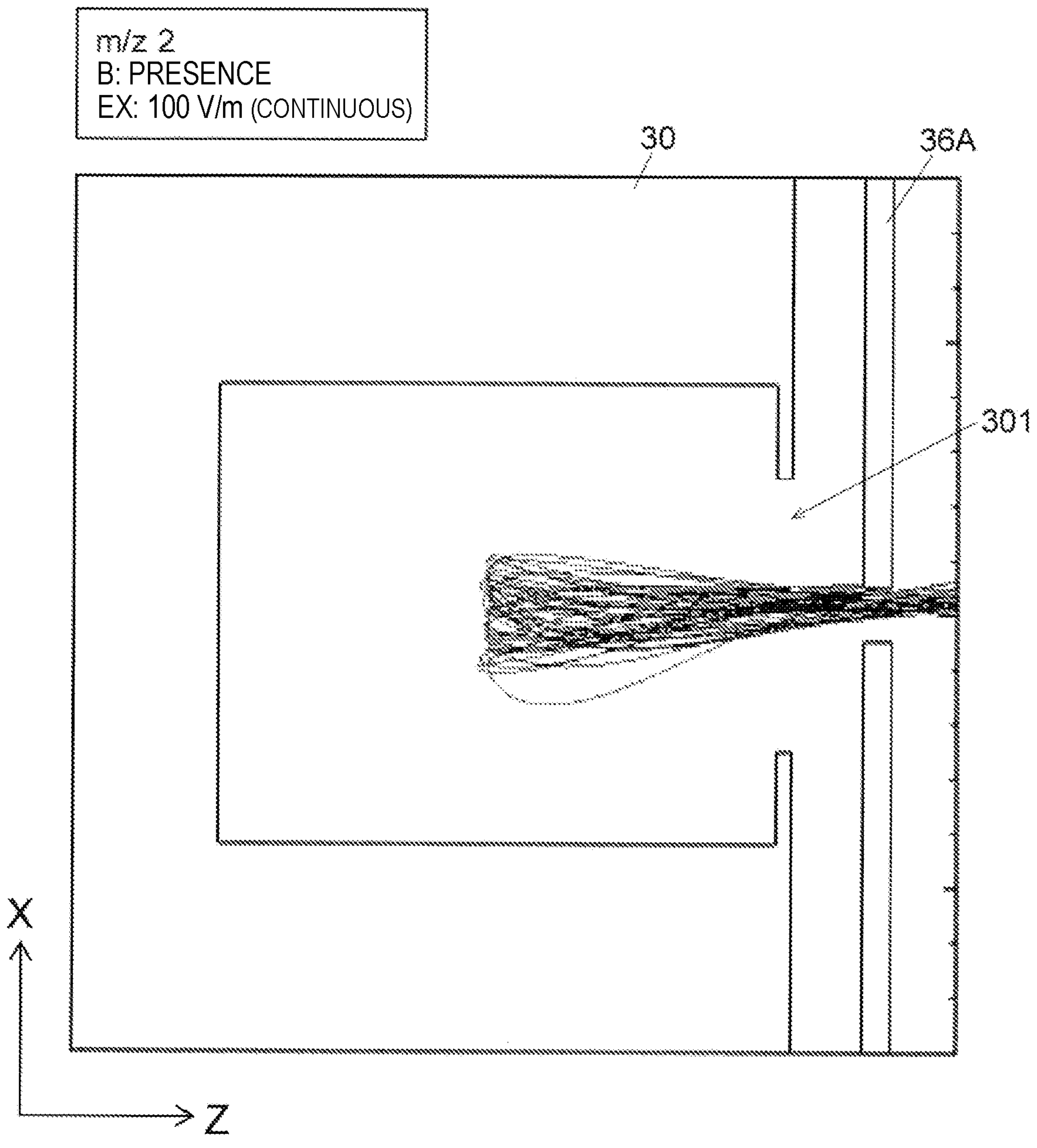
FIG. 7 is a view illustrating a simulation result of an ion trajectory inside an ionization chamber (m/z 2, with a magnetic field for convergence or thermal electrons and with a continuous ion deflection electric field).
Figure 8:
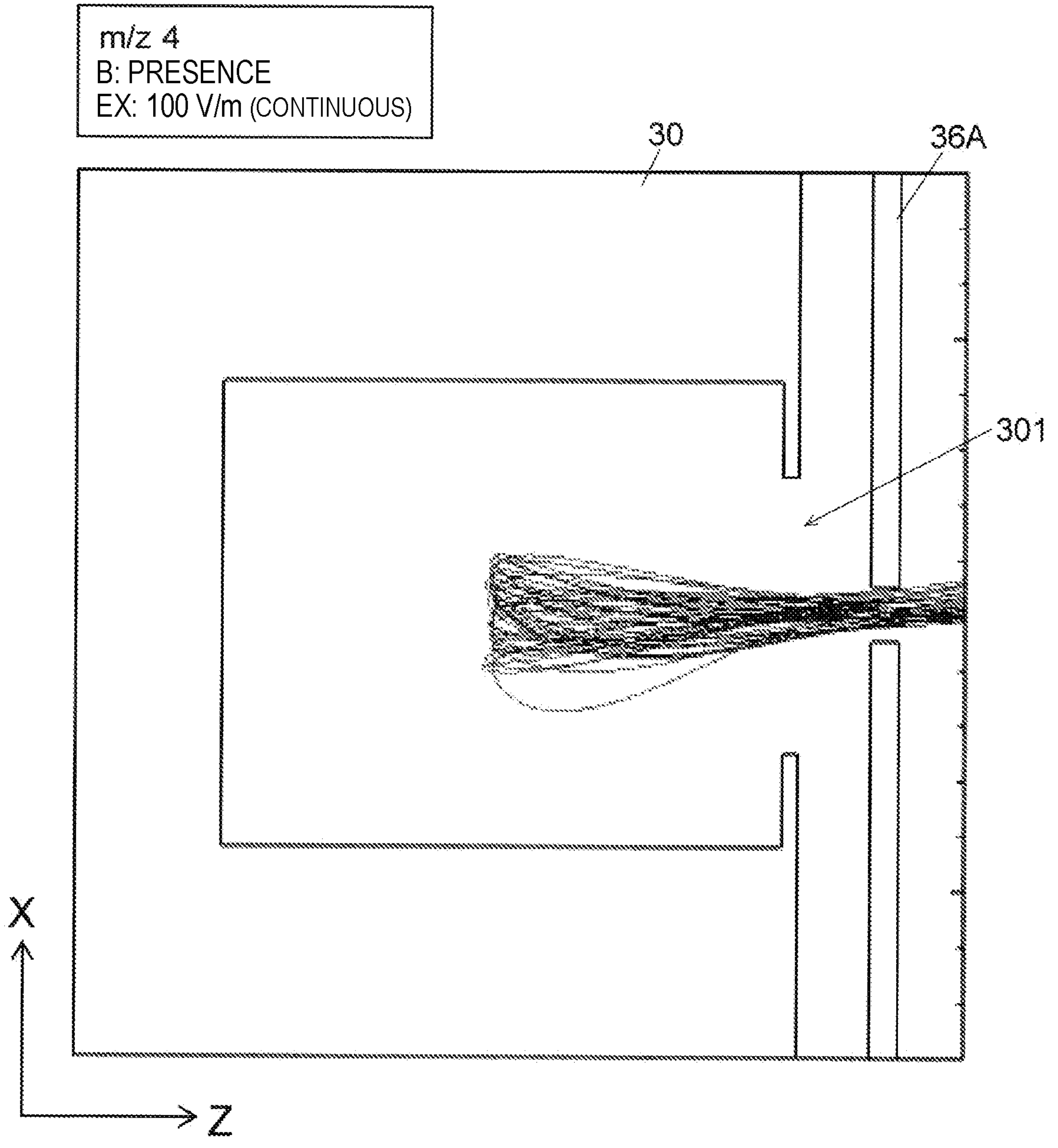
FIG. 8 is a view illustrating a simulation result of an ion trajectory inside an ionization chamber (m/z 4, with a magnetic field for convergence or thermal electrons and with a continuous ion deflection electric field).
Figure 9:
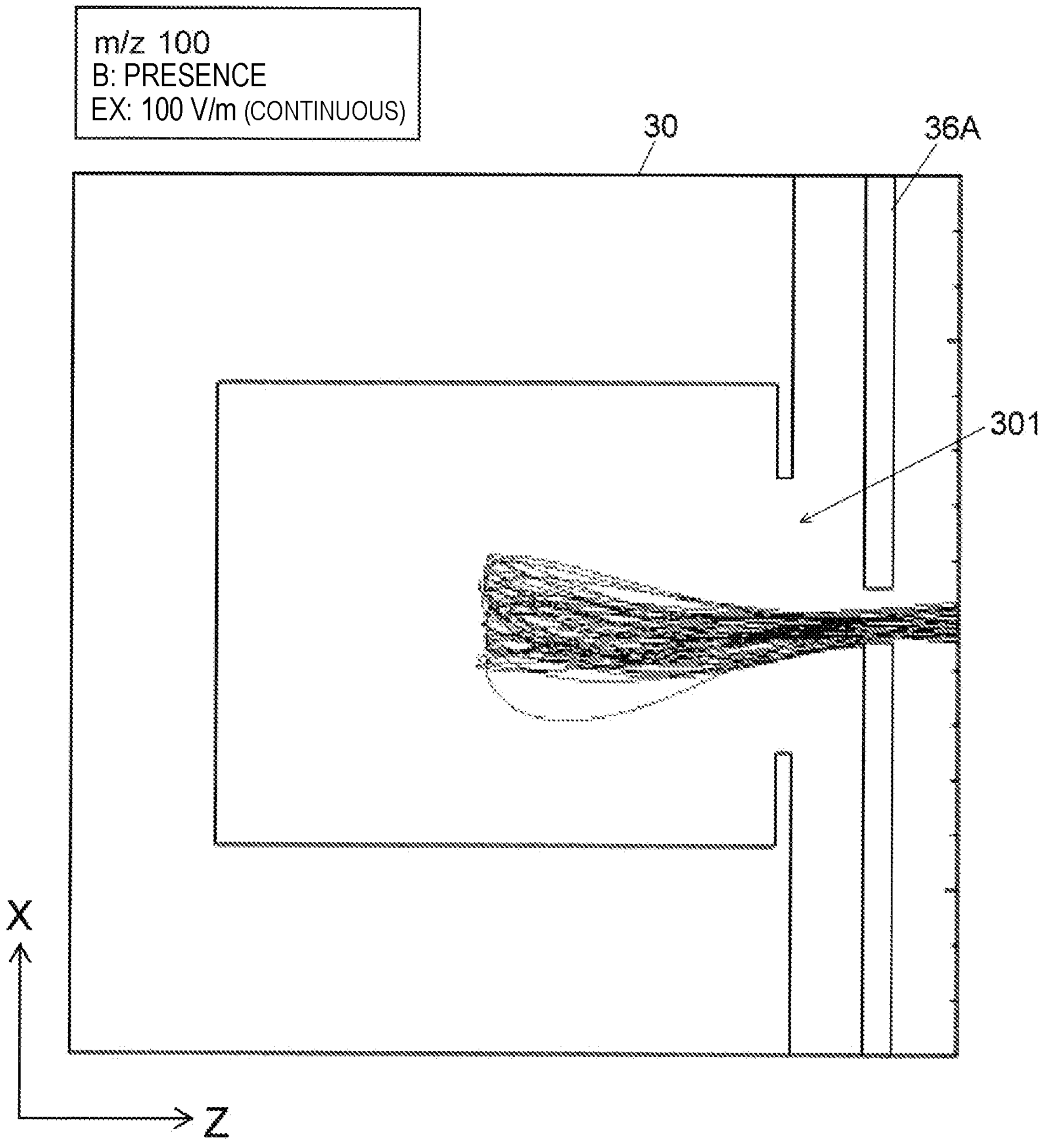
FIG. 9 is a view illustrating a simulation result of an ion trajectory inside an ionization chamber (m/z 100, with a magnetic field for convergence or thermal electrons and with a continuous ion deflection electric field).

FIGS. 7 to 9 are simulation results of trajectories of ions of m/z 2, m/z 4, and m/z 100 with the magnetic field and the deflection electric field formed (electric field intensity is 100

V/m), respectively. It can be found from FIGS. 7 and 8 that the trajectories of light ions having m/z 2 and m/z 4 are corrected by the action of the deflection electric field, and the amount of ions passing through the ion passing opening of the extraction electrode 36A clearly increases. Whereas, as illustrated in FIG. 9, it can be found that ions of m/z 100, which are heavier than those ions, are pushed by the action of the deflection electric field although there is almost no bending of the trajectory by the action of the magnetic field, and thus the trajectory of the ions is likely to be shifted in the negative direction of the X-axis and some ions are not likely to pass through the ion passing opening. That is, if the deflection electric field is equally applied to light ions and heavy ions, sensitivity of the heavy ions is likely to be reduced.

Figure 17:
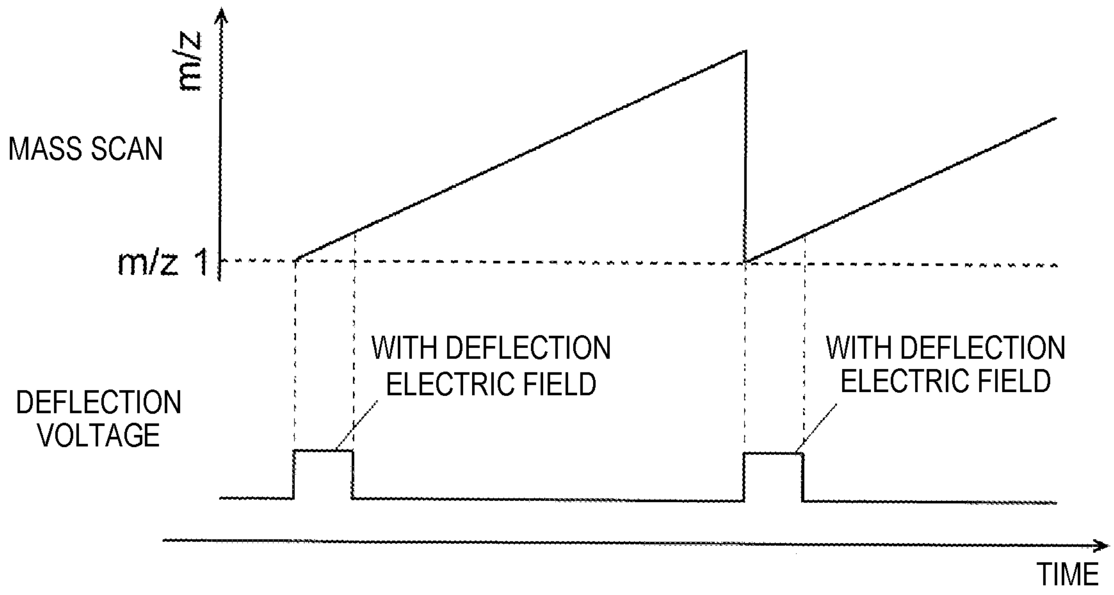
FIG. 17 is a schematic view illustrating timings of mass scanning and deflection electric field formation in the mass spectrometer of the present embodiment.

In the mass spectrometer of the present embodiment, generally analysis in either a scan mode or a selected ion monitoring (SIM) mode is performed. FIG. 17 is a schematic view illustrating an example of timings of mass scanning and deflection electric field formation in the scan mode.

The scan range of the mass scan is, for example, m/z 1 to m/z 1000, and in the example illustrated in FIG. 17, scanning is repeatedly performed in a direction in which the mass-to-charge ratio increases. For example, at time t1 in FIG. 17, a predetermined voltage is applied from the quadrupole voltage generator 8 to the rod electrodes constituting the quadrupole mass filter 5 so that ions of m/z 2 selectively pass through the quadrupole mass filter 5. As described above, for ions having a small mass-to-charge ratio, it is necessary to correct the bend of the ion trajectory due to the influence of the magnetic field in the EI ion source 3. Therefore, the control unit 9 controls the deflection voltage generator 7 so as to apply the deflection voltage Vd for forming a deflection electric field to the deflection electrode 37 in synchronization with the timing at which ions having a small mass-to-charge ratio are selectively passed through the quadrupole mass filter 5. The period during which the deflection electric field is formed (the pulse width of the deflection voltage in FIG. 17) may be determined previously according to the range of the mass-to-charge ratio of the ion that is necessary to correct the bend of the trajectory due to the influence of the magnetic field.

Thus, when performing analysis in the scan mode, it is possible to efficiently extract ions generated by the EI ion source 3 from the ionization chamber 30 and analyze by the quadrupole mass filter 5 for ions having any mass-to-charge ratio from a low mass-to-charge ratio to a high mass-to-charge ratio. As a result, high analysis sensitivity for any ion can be achieved.

In the case of the SIM mode, the mass-to-charge ratio of the ions to be measured is determined, and thus using this mass-to-charge ratio, it may be determined whether the deflection voltage Vd is applied to the deflection electrode 37.

In addition, the degree of bending of the trajectory due to the magnetic field varies depending on the mass-to-charge ratio, and thus the degree of improvement of the analysis sensitivity can be increased by switching the value of the deflection voltage Vd not only in binary but in multiple stages.

The mass spectrometer of the above embodiment uses a quadrupole mass filter as a mass separator, and measures only ions having a certain specific mass-to-charge ratio at a certain time point, so that the above-described control can be performed. Whereas, in a mass spectrometer using, for example, a fan-shaped magnetic field-type mass separator, a quadrature acceleration time-of-flight mass separator, or the like as a mass separator, ions that have entered the mass separator at substantially the same time are separated according to the mass-to-charge ratio, and thus, it is not possible to adopt the control as described above. Therefore, in such a mass spectrometer, the following control may be performed.

Figure 10:
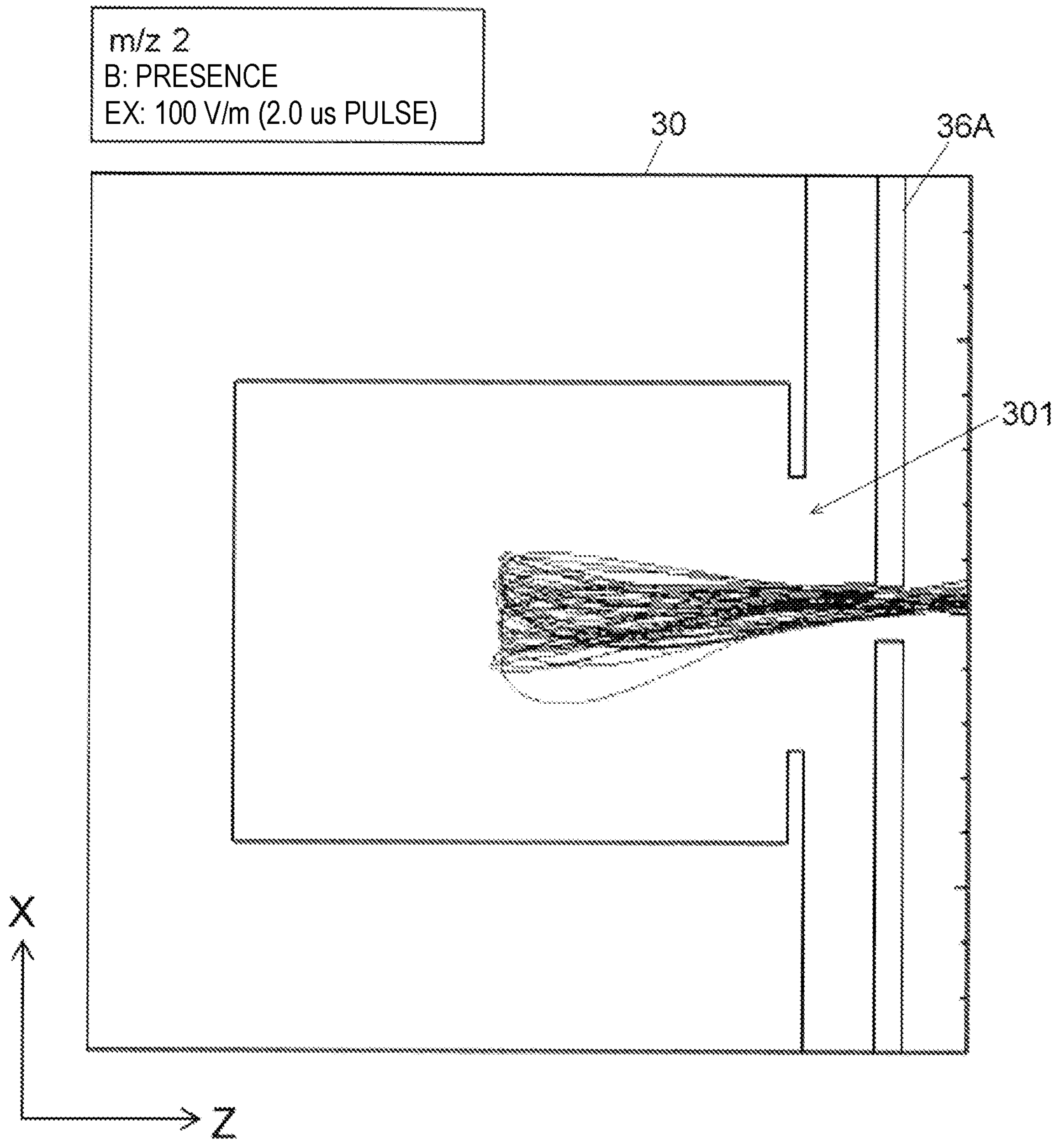
FIG. 10 is a view illustrating a simulation result of an ion trajectory inside an ionization chamber (m/z 2, with a magnetic field for convergence or thermal electrons and with a continuous ion deflection electric field).
Figure 11:
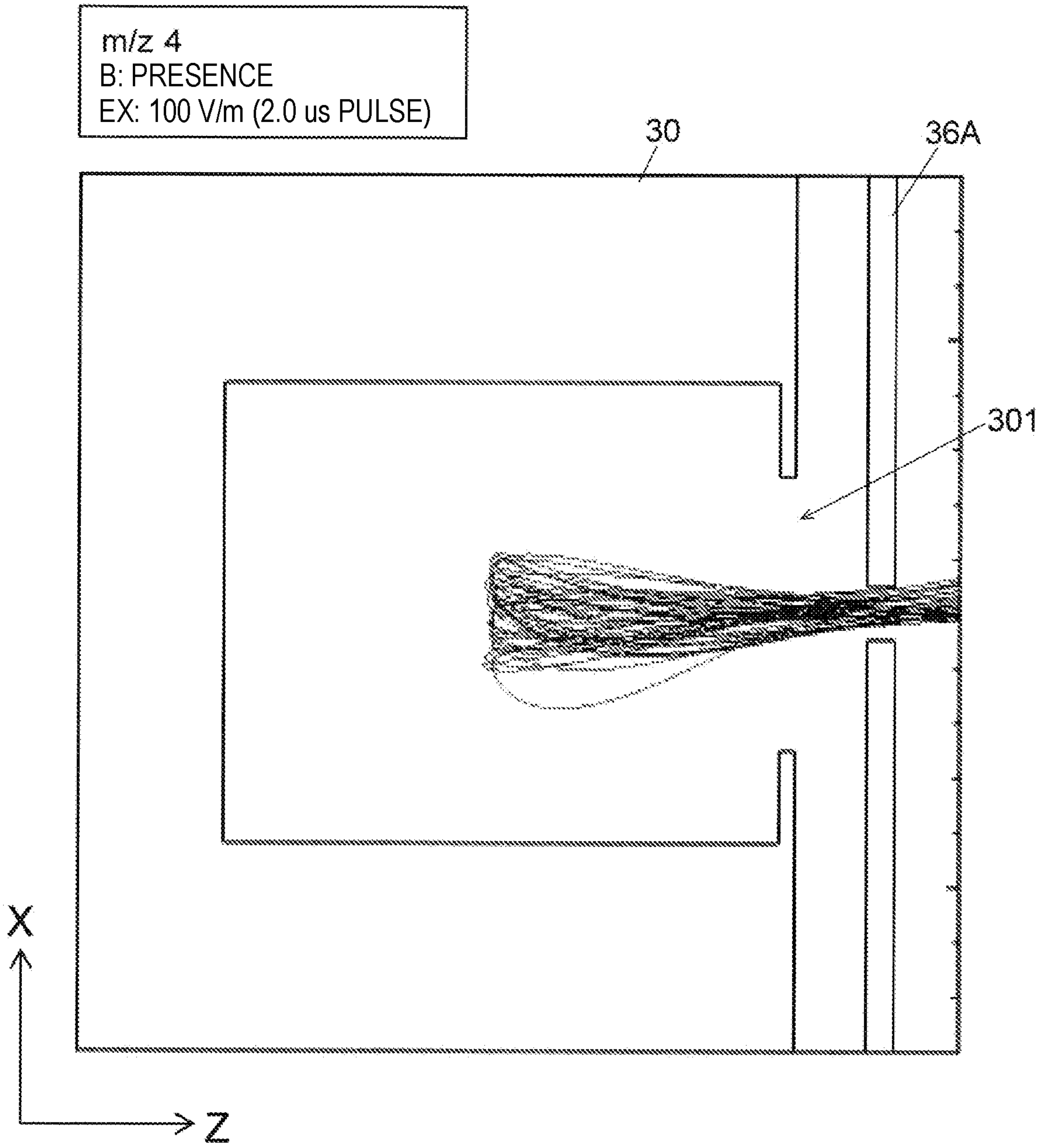
FIG. 11 is a view illustrating a simulation result of an ion trajectory inside an ionization chamber (m/z 4, with a magnetic field for convergence or thermal electrons and with a continuous ion deflection electric field).
Figure 12:
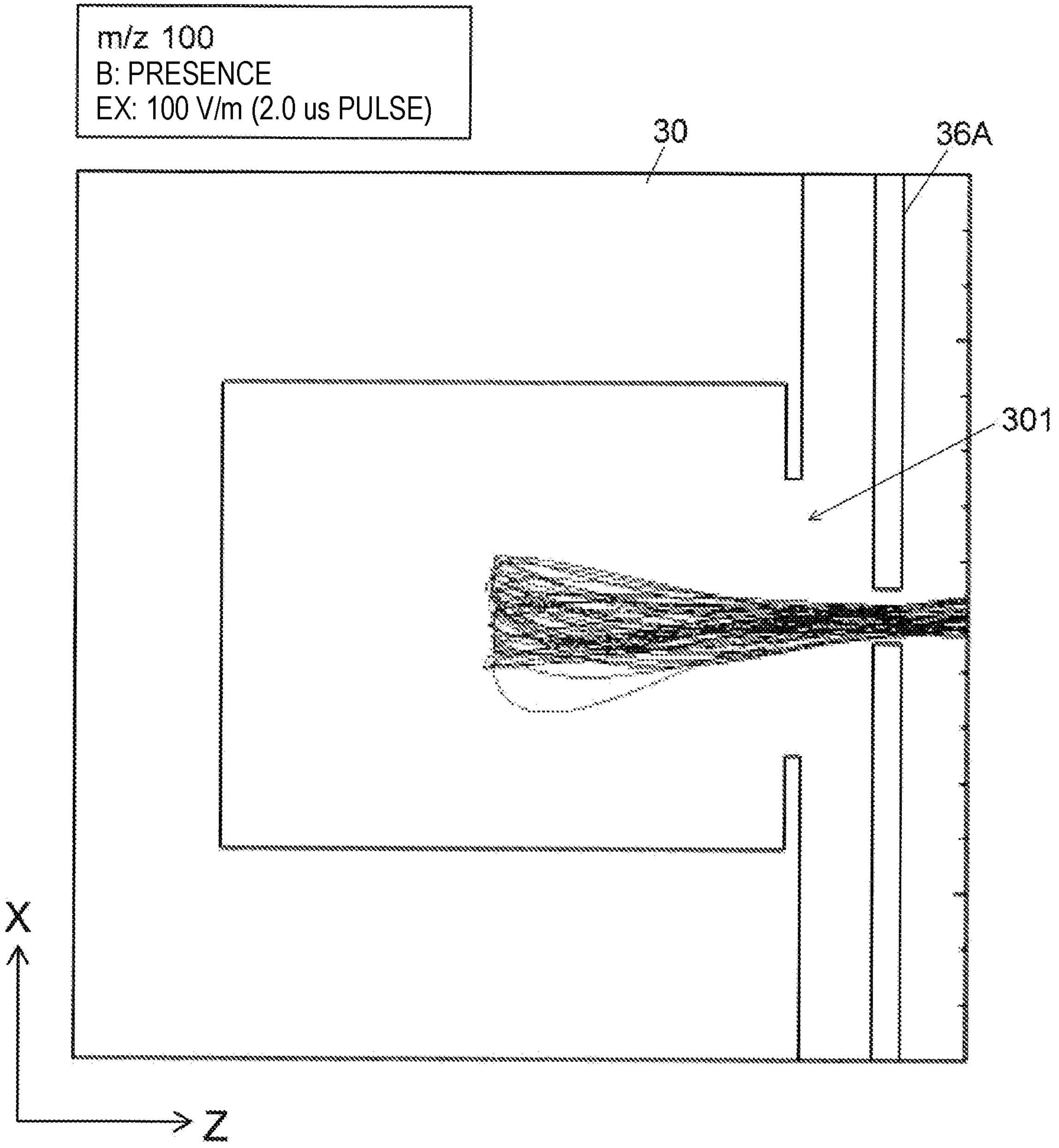
FIG. 12 is a view illustrating a simulation result of an ion trajectory inside an ionization chamber (m/z 100, with a magnetic field for convergence or thermal electrons and with a continuous ion deflection electric field).

FIGS. 10 to 12 are simulation results of ion trajectories with m/z 2, m/z 4, and m/z 100 with a magnetic field and a deflection electric field (electric field intensity is 100 V/m) formed only for 2.0 us. As can be found from a comparison between FIGS. 7 and 10 and a comparison between FIGS. 8 and 11, even in a case where the period during which the deflection electric field is acting is 2.0 us, the bending of the trajectory of the ions due to the action of the magnetic field is sufficiently corrected, and almost all the ions can pass through the ion passing opening. Whereas, as can be found from a comparison between FIG. 9 and FIG. 12, for the ions of m/z 100, if the period during which the deflection electric field is acting is set to 2.0 us, the influence of the deflection electric field is alleviated, and the ions pass through the ion passing opening without colliding with the extraction electrode 36A.

FIGS. 13 to 16 are views illustrating simulation results of temporal position changes of ions inside the ionization chamber 30 with both the magnetic field and the deflection electric field. In these views, the horizontal axis represents the position in the Z-axis direction, and the vertical axis represents the time during which ions pass through the X-Y plane at each position on the Z-axis. Therefore, in these views, the time at the position Z1 corresponding to the left surface of the extraction electrode 36A represents the time until the ions generated near the center of the ionization chamber 30 reach the left surface of the extraction electrode 36A.

Figure 13:
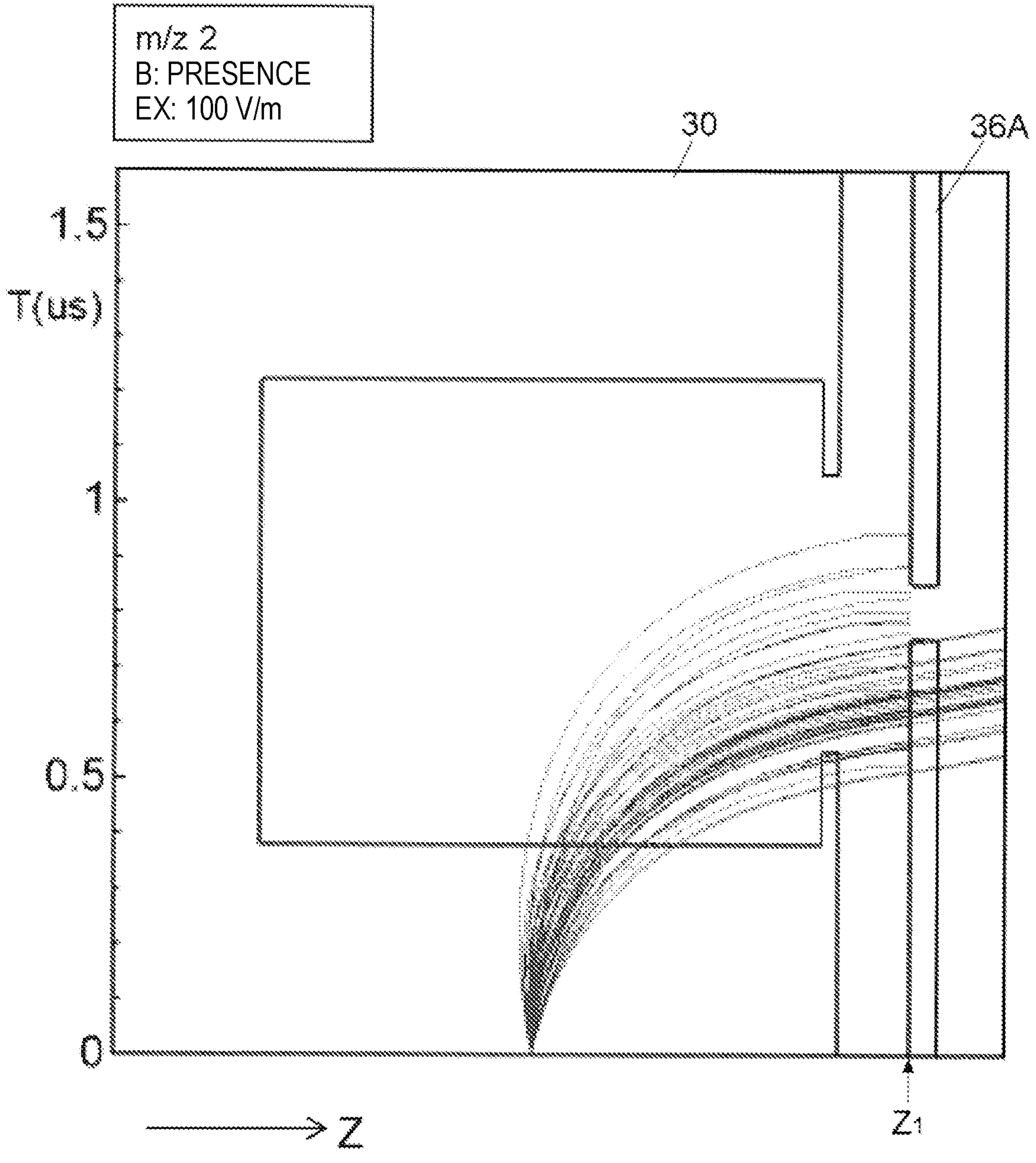
FIG. 13 is a view illustrating a simulation result of a temporal position change of ions in an ionization chamber (m/z 2, with the magnetic field for convergence of thermal electrons and with the ion deflection electric field).
Figure 14:
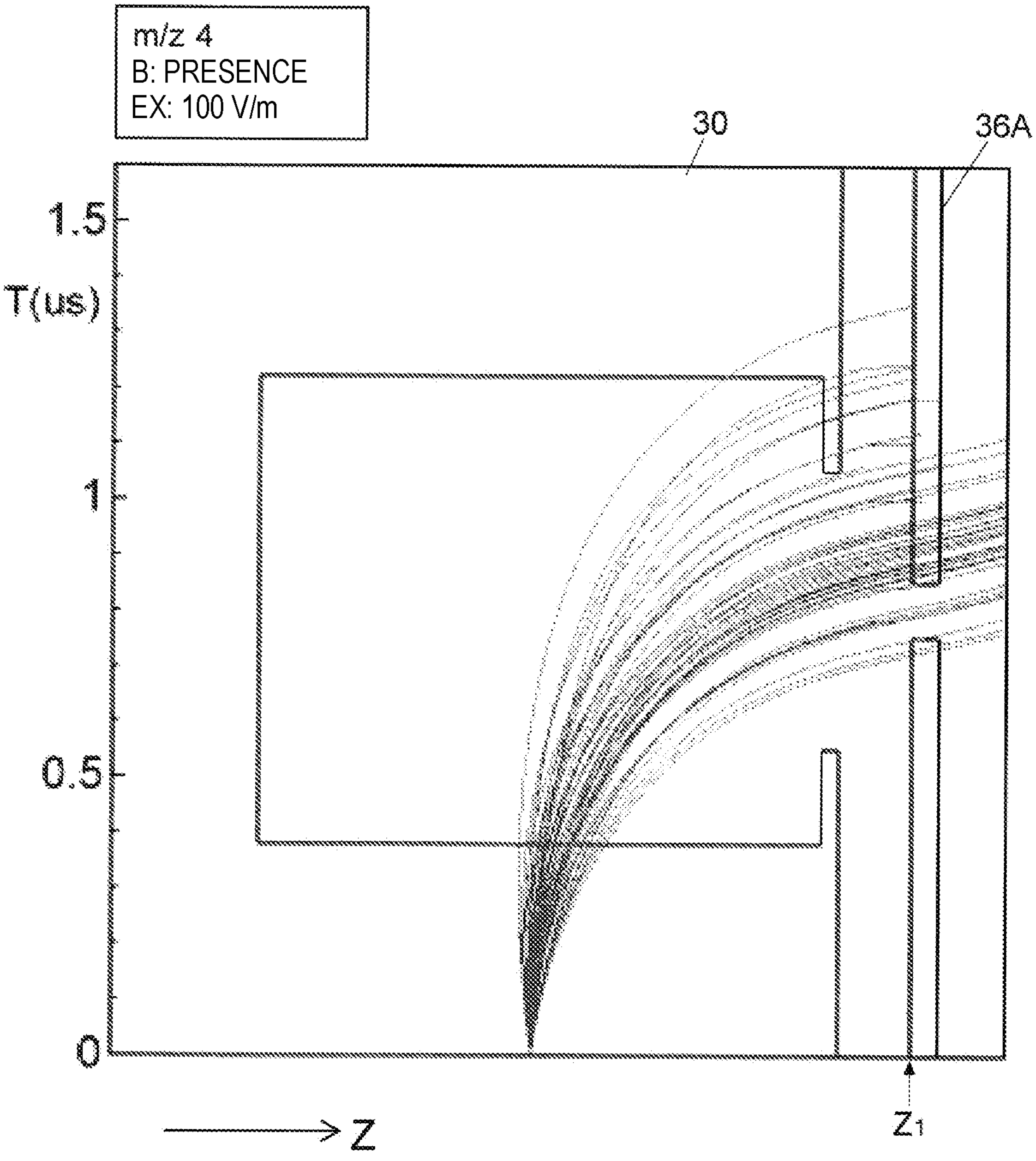
FIG. 14 is a view illustrating a simulation result of a temporal position change of ions in an ionization chamber (m/z 4, with the magnetic field for convergence of thermal electrons and with the ion deflection electric field).
Figure 15:
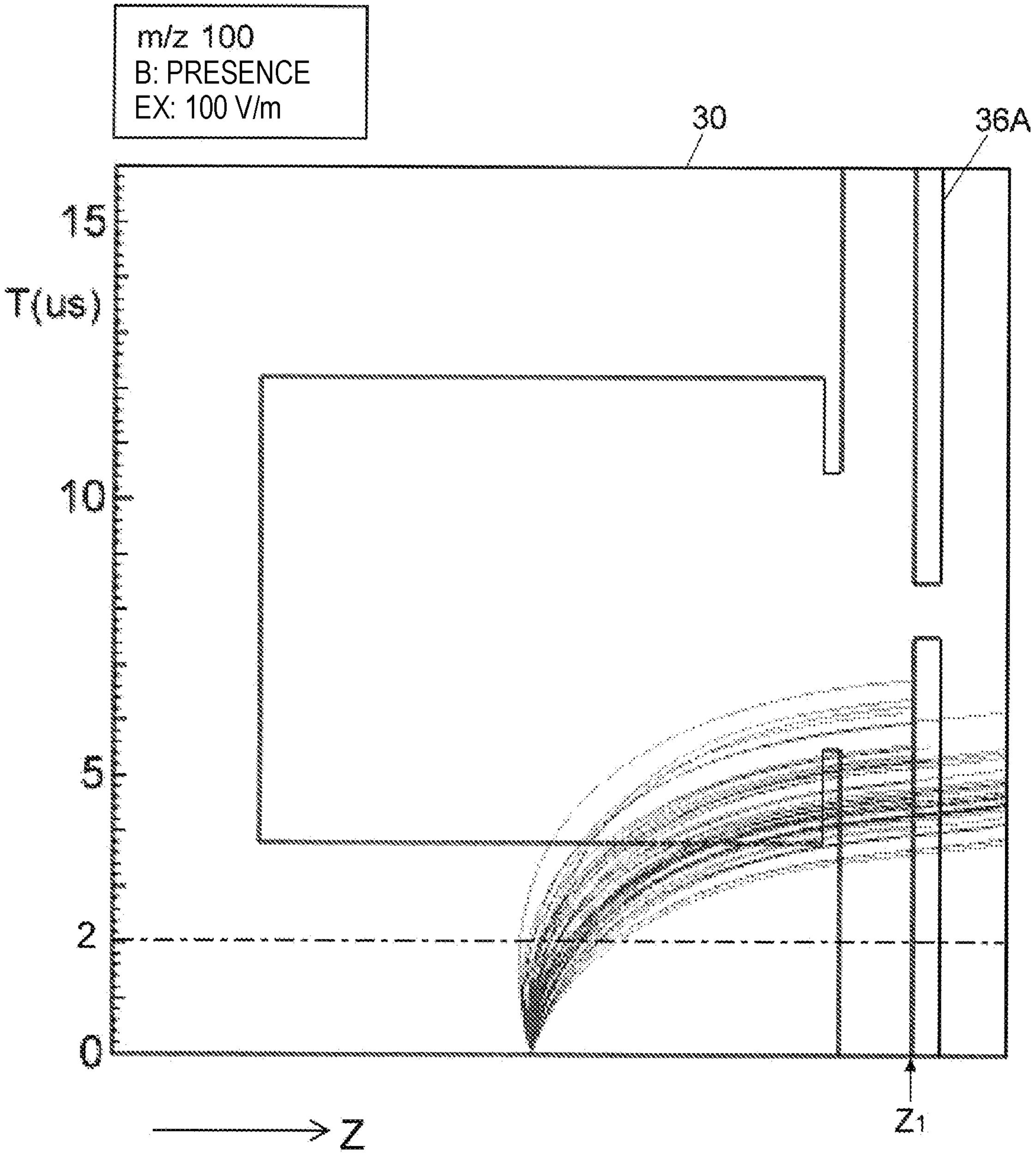
FIG. 15 is a view illustrating a simulation result of a temporal position change of ions in an ionization chamber (m/z 100, with the magnetic field for convergence of thermal electrons and with the ion deflection electric field).
Figure 16:
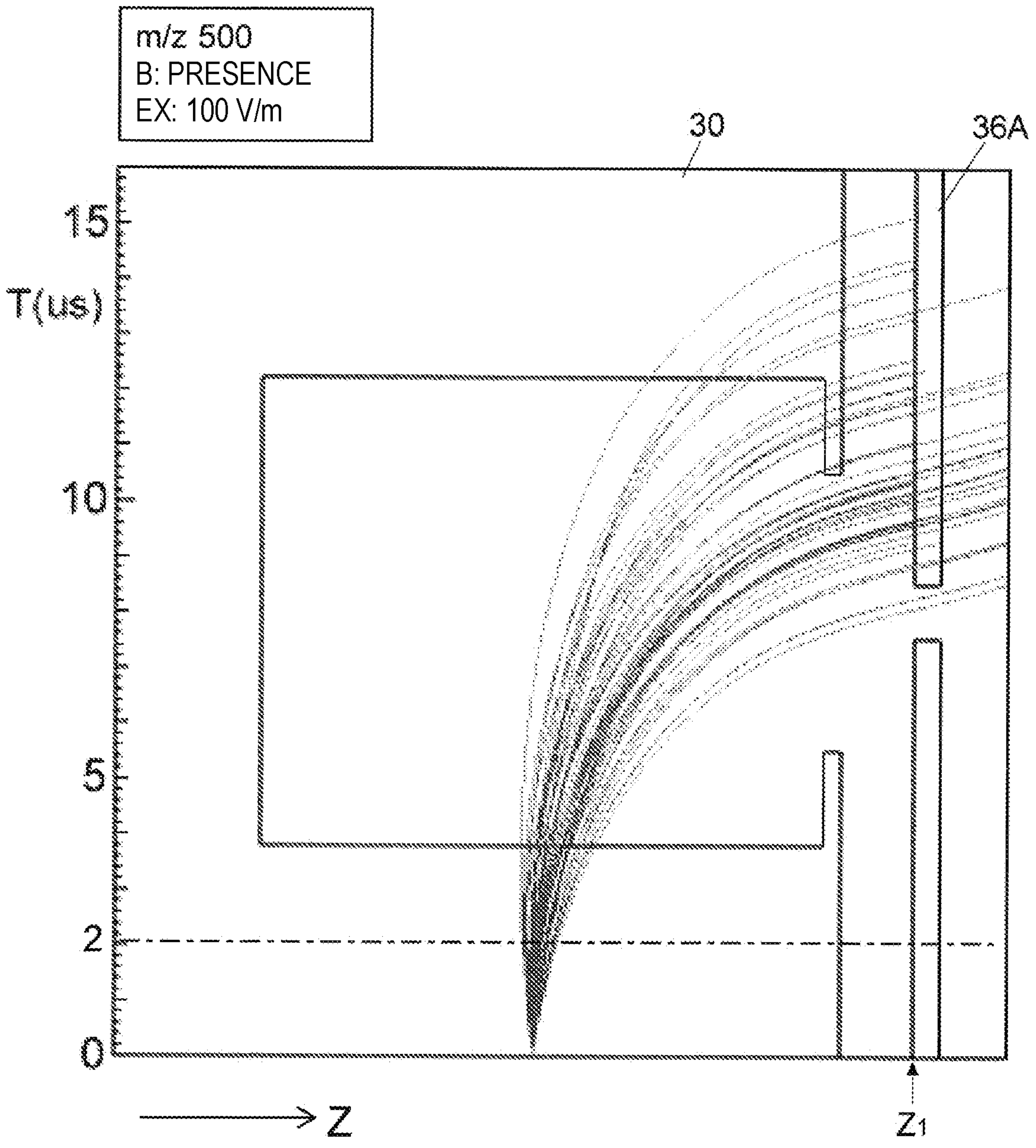
FIG. 16 is a view illustrating a simulation result of a temporal position change of ions in an ionization chamber (m/z 500, with the magnetic field for convergence of thermal electrons and with the ion deflection electric field).

As illustrated in FIGS. 13 and 14, ions of m/z 2 and m/z 4 reach the left surface of the extraction electrode 36A within 1.5 us after being generated near the center of the ionization chamber 30. In contrast, as illustrated in FIG. 15, the ion of m/z 100 is generated near the center of the ionization chamber 30, and it takes about 3 to 7 us to reach the left surface of the extraction electrode 36A. As illustrated in FIG. 16, the ion of m/z 500 is generated near the center of the ionization chamber 30, and it takes about 8 to 15 us to reach the left surface of the extraction electrode 36A. In addition, from FIGS. 15 and 16, it can be found that the ion at m/z 100 to 500 moves only slightly in the Z-axis direction from the starting position at the point of time when 2 us has elapsed from the point of time when the ion is generated, and exists at a position where there is still a sufficient distance to the ion ejection opening.

From these results, it can be concluded that if the period for forming the deflection electric field is 2 us, light ions of at least m/z 2 to 4 can reliably pass through the ion passing opening of the extraction electrode 36A, whereas heavy ions of m/z 100 or more can pass through the ion passing opening of the extraction electrode 36A with a small loss substantially without being affected by the deflection electric field.

Figure 18:
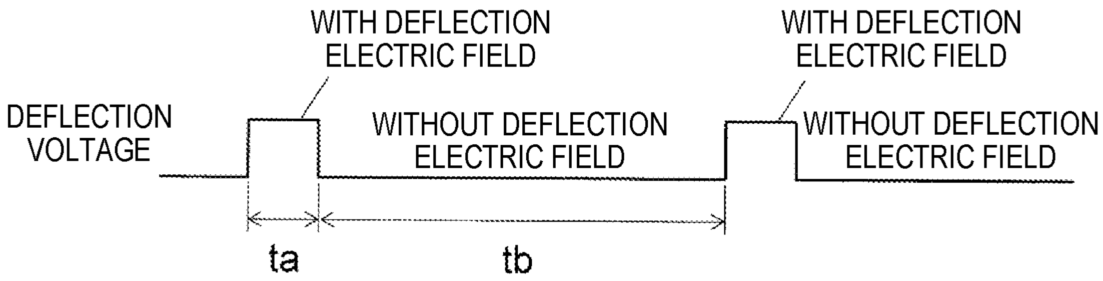
FIG. 18 is an explanatory view of a timing of forming a deflection electric field in a mass spectrometer of another embodiment.

Therefore, in a case where it is desired to send ions having a wide mass-to-charge ratio generated in the ionization chamber 30 substantially simultaneously to the subsequent stage, the control unit 9 may control the deflection voltage generator 7 so that the deflection voltage is intermittently applied to the deflection electrode 37 as illustrated in FIG. 18. Herein, as an example, ta is 2.0 us.

Whereas, tb may be appropriately determined according to the upper limit value of the mass-to-charge ratio range to be measured. For example, if the upper limit value is m/z 500, it can be found from FIG. 16 that almost all ions having m/z 500 can reach the extraction electrode 36A within 15 us. Therefore, if the period during which the deflection electric field is not formed, that is, the above-described tb is set to 15 us, ions having m/z of 500 or less and hardly affected by the magnetic field can pass through the ion passing opening of the extraction electrode 36A. That is, in a case where the measurement mass-to-charge ratio range is, for example, m/z 1 to 500, if ta=2 us and tb=15 us are set, ions over the entire measurement mass-to-charge ratio range are sent to the subsequent stage in a well-balanced manner, and high analysis sensitivity can be achieved. If the upper limit value of the measurement mass-to-charge ratio range is higher, tb may be set to be longer, and conversely, if the upper limit value of the measurement mass-to-charge ratio range is lower, tb may be set to be shorter.

Figure 19:
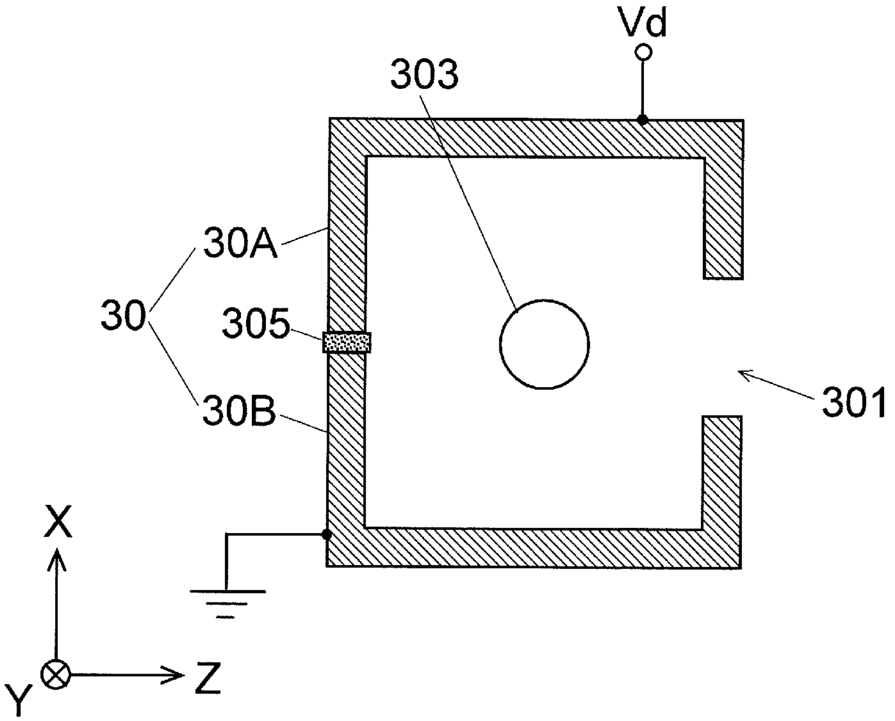
FIG. 19 is a schematic lateral end view of an EI ion source in a mass spectrometer of a modification.
Figure 20:
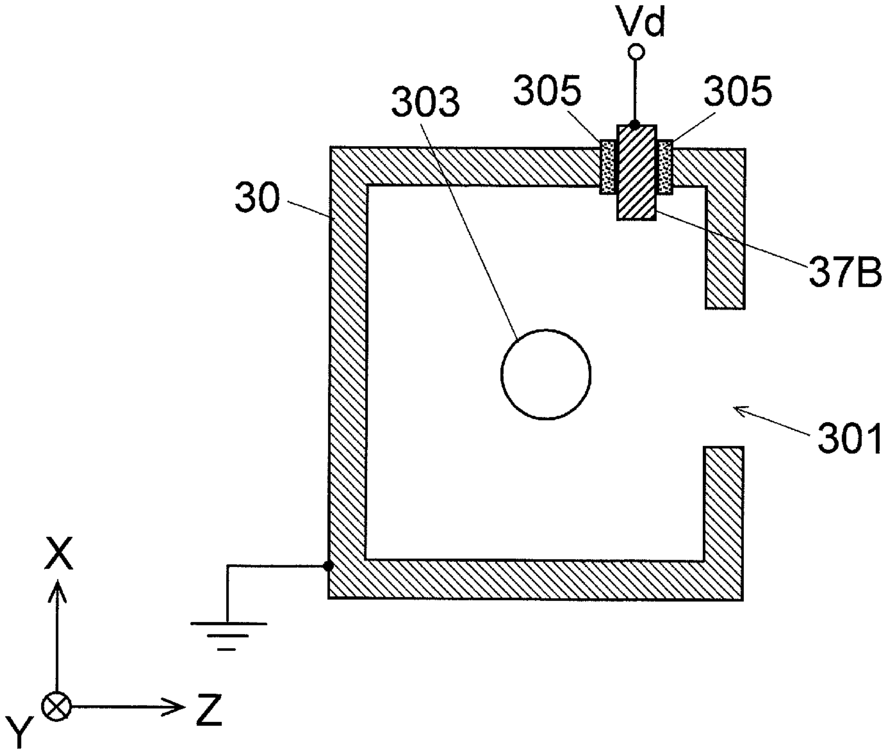
FIG. 20 is a schematic lateral end view of an EI ion source in a mass spectrometer of another modification.

In the mass spectrometer of the above embodiment, the deflection electrode 37 for forming a deflection electric field in the ionization chamber 30 is disposed in the ionization chamber 30, but in general, the ionization chamber is very small, and it may be difficult to add a new electrode inside the ionization chamber 30. In this case, a configuration as illustrated in FIG. 19 or 20 may be adopted. FIGS. 19 and 20 are lateral end views of the ionization chamber 30, which are similar to FIG. 2B.

In the example illustrated in FIG. 19, the ionization chamber 30 itself is divided into two (30A, 30B) in the X-axis direction, and the two partial ionization chambers 30A and 30B are connected via an insulating member 305 between them. Then, one partial ionization chamber 30B is grounded, and the deflection voltage Vd is applied to the other partial ionization chamber 30A. With such a configuration, a deflection electric field similar to that of the above embodiment can be formed.

In the example illustrated in FIG. 20, a hole is provided in the wall of the ionization chamber 30, and a bar-shaped deflection electrode 37B is inserted into the hole. The deflection electrode 37B and the ionization chamber 30 are insulated by a cylindrical insulating member 305. In this configuration, the end portion of the deflection electrode 37B protrudes to the outside of the ionization chamber 30, and thus power supply is easy as compared with the configuration illustrated in FIGS. 2A and 2B. With such a configuration, a deflection electric field similar to that of the above embodiment can be formed.

The previously described embodiment and its modifications are mere examples of the present invention. Any change, modification, or addition appropriately made within the spirit of the present invention will evidently fall within the scope of the claims of the present application.

For example, the mass spectrometer of the above embodiment uses the EI ion source, but may be an ion source that performs ionization using thermal electrons and uses a magnetic field for convergence of thermal electrons. Therefore, the present invention can also be applied to, for example, a mass spectrometer using a CI ion source or an NCI ion source.

In addition, as described above, the configuration of the device except for the ion source is not limited to that of the previously described embodiment and may be appropriately changed. Therefore, it is reasonable that the mass spectrometer according to the present invention can be applied not only to a single-type quadrupole mass spectrometer but also to various types of mass spectrometers such as a time-of-flight mass spectrometer, an ion trap mass spectrometer, a triple quadrupole mass spectrometer, a fan-shaped magnetic field mass spectrometer, and an ion movement-mass spectrometer.

[Various Modes]

A person skilled in the art can understand that the previously described illustrative embodiment is a specific example of the following modes of the present invention.

(Clause 1) One mode of the mass spectrometer according to the present invention is a mass spectrometer including an ion source configured to ionize a component contained in a sample gas, the ion source including:

an ionization chamber having an ion ejection opening and forming a space substantially partitioned from an outside inside the ionization chamber;

a thermal electron supply unit configured to supply thermal electrons to an inside of the ionization chamber;

a magnetic field forming unit configured to form a magnetic field inside the ionization chamber such that the thermal electrons move helically; and a deflection electric field forming unit configured to form a deflection electric field deflecting ions derived from the component generated in the ionization chamber by a direct or indirect action of the thermal electrons in a direction against a force received from the magnetic field when the ions are moving toward the ion ejection opening.

In the ion source of the mass spectrometer according to Clause 1, the thermal electrons supplied into the ionization chamber by the thermal electron supply unit travel while helically swirling by the action of the magnetic field formed by the magnetic field forming unit. As described above, the magnetic field has an action of suppressing the spread of the thermal electron flow, but ions having a low mass-to-charge ratio are also affected by the magnetic field, and the ion trajectory is bent when the ions travel toward the ion ejection opening.

In the mass spectrometer according to Clause 1, the bending of the trajectory generated when the ions generated in the ionization chamber receive the force from the magnetic field is corrected by the action of the electric field formed by the deflection electric field forming unit. With this configuration, it is possible to suppress loss when ions generated in the ionization chamber are extracted from the ionization chamber to the outside, and to improve ion extraction efficiency. As a result, a larger amount of ions can be subjected to mass spectrometry, and the analysis sensitivity can be improved.

In order to improve the analysis sensitivity of light ions whose trajectory is easily bent due to the influence of the magnetic field, a deflection electric field having a predetermined electric field intensity may be continuously formed, but in this case, the trajectory of heavy ions that are hardly affected by the magnetic field are likely to be bent due to the influence of the deflection electric field, and an ion loss may occur.

(Clause 2) Therefore, in the mass spectrometer according to Clause 1, the deflection electric field forming unit may include an electrode disposed inside the ionization chamber or as a part of an inner wall of the ionization chamber, and a voltage generator configured to intermittently apply a voltage to the electrode.

With the mass spectrometer described in Clause 2, light ions are efficiently sent to the subsequent stage during a period in which the deflection electric field is formed, whereas heavy ions are efficiently sent to the subsequent stage during a period in which the deflection electric field is not formed. As a result, it is possible to supply entire ions including light ions to heavy ions in a well-balanced manner and to improve the analysis sensitivity for ions having a wide mass-to-charge ratio.

(Clause 3) In addition, the mass spectrometer according to Clause 1 may further include a control unit which includes a quadrupole mass filter as a mass separator and which is configured to adjust timing of forming the deflection electric field depending on a mass-to-charge ratio of ions selectively passing through the quadrupole mass filter.

For example, when the mass-to-charge ratio of ions passing through the quadrupole mass filter is scanned in order to perform the analysis of the scan mode, a deflection electric field may be formed when light ions are emitted from the ion source in accordance with the timing at which the light ions pass through the quadrupole mass filter. That is, the scanning of the voltage applied to the electrode constituting the quadrupole mass filter is synchronized with the timing of forming the deflection electric field in the ionization chamber. Thus, when performing scan mode analysis, it is possible to perform analysis with high sensitivity for any ions from ions with a low mass-to-charge ratio to ions with a high mass-to-charge ratio.

Whereas, in a case where analysis of ions having a specific mass-to-charge ratio is performed for a certain period of time as in the SIM mode, whether a deflection electric field is formed or not may be switched according to the mass-to-charge ratio.

REFERENCE SIGNS LIST

1 . . . Chamber
3 . . . EI Ion Source
30 . . . Ionization Chamber
301 . . . Ion Ejection Opening
302 . . . Electron Introduction Opening
303 . . . Electron Discharge Opening
304 . . . Sample Gas Introduction Tube
305 . . . Insulating Member
30A, 30B . . . Partial Ionization Chamber
31 . . . Repeller Electrode
32 . . . Filament
33 . . . Trap Electrode
34, 35 . . . Magnet
36, 36A . . . Extraction Electrode
37, 37B . . . Deflection Electrode
4 . . . Ion Transport Optical System
5 . . . Quadrupole Mass Filter
6 . . . Ion Detector
7 . . . Deflection Voltage Generator
8 . . . Quadrupole Voltage Generator
9 . . . Control Unit

The invention claimed is:

1. A mass spectrometer including an ion source configured to ionize a component contained in a sample gas, the ion source comprising:

an ionization chamber having an ion ejection opening and forming a space substantially partitioned from an outside inside the ionization chamber;

a thermal electron supply unit configured to supply thermal electrons to an inside of the ionization chamber;

a magnetic field forming unit configured to form a magnetic field inside the ionization chamber such that the thermal electrons move helically;

a deflection electric field forming unit configured to form a deflection electric field deflecting ions derived from the component generated in the ionization chamber by a direct or indirect action of the thermal electrons in a direction against a force received from the magnetic field when the ions are moving toward the ion ejection opening; and a control unit which includes a quadrupole mass filter as a mass separator and which is configured to adjust timing of forming the deflection electric field depending on a mass-to-charge ratio of ions selectively passing through the quadrupole mass filter.

2. A mass spectrometer including an ion source configured to ionize a component contained in a sample gas, the ion source comprising:

an ionization chamber having an ion ejection opening and forming a space substantially partitioned from an outside inside the ionization chamber;

a thermal electron supply unit configured to supply thermal electrons to an inside of the ionization chamber;

a magnetic field forming unit configured to form a magnetic field inside the ionization chamber such that the thermal electrons move helically; and a deflection electric field forming unit configured to form a deflection electric field deflecting ions derived from the component generated in the ionization chamber by a direct or indirect action of the thermal electrons in a direction against a force received from the magnetic field when the ions are moving toward the ion ejection opening, wherein the deflection electric field forming unit includes:

an electrode disposed inside the ionization chamber or as a part of an inner wall of the ionization chamber, and a voltage generator configured to apply a voltage to the electrode, and a control unit configured to control the voltage generator so that the voltage is intermittently applied to the electrode.

* * * * *